United States Patent
Sullivan et al.

(10) Patent No.: US 12,393,934 B2
(45) Date of Patent: Aug. 19, 2025

(54) METHOD OF RETAINING TRANSACTION CONTEXT

(71) Applicant: VISA EUROPE LIMITED, London (GB)

(72) Inventors: Brian Sullivan, London (GB); David Wilson, London (GB); David Harbige, London (GB)

(73) Assignee: VISA EUROPE LIMITED, London (GB)

( * ) Notice: Subject to any disclaimer, the term of this patent is extended or adjusted under 35 U.S.C. 154(b) by 730 days.

(21) Appl. No.: 15/791,146

(22) Filed: Oct. 23, 2017

(65) Prior Publication Data

US 2018/0047019 A1  Feb. 15, 2018

Related U.S. Application Data

(63) Continuation of application No. PCT/GB2016/051033, filed on Apr. 13, 2016.

(30) Foreign Application Priority Data

Apr. 24, 2015 (GB) .................................. 1507047

(51) Int. Cl.
  *G06Q 20/38* (2012.01)
  *G06Q 20/40* (2012.01)

(52) U.S. Cl.
  CPC ... *G06Q 20/3821* (2013.01); *G06Q 20/38215* (2013.01); *G06Q 20/3829* (2013.01);
  (Continued)

(58) Field of Classification Search
  CPC ........... G06Q 20/3821; G06Q 20/3829; G06Q 20/389; G06Q 20/4018; G06Q 20/409
  See application file for complete search history.

(56) References Cited

U.S. PATENT DOCUMENTS

| | | |
|---|---|---|
| 7,577,585 B2 | 8/2009 | Horrocks et al. |
| 7,983,987 B2 | 7/2011 | Kranzley et al. |

(Continued)

FOREIGN PATENT DOCUMENTS

| | | |
|---|---|---|
| KR | 102014005230 A | 5/2014 |
| WO | 2011031804 A1 | 3/2011 |
| WO | 2015054697 | 4/2015 |

OTHER PUBLICATIONS

Hany Harb et al., SecureSMSPay: Secure SMS Mobile Payment Model, Nov. 25, 2008, IEEE, pp. 1-7 (Year: 2008)*

(Continued)

*Primary Examiner* — Nilesh B Khatri
(74) *Attorney, Agent, or Firm* — Kilpatrick Townsend & Stockton LLP

(57) ABSTRACT

Methods of transaction authentication are provided. In one such method, at least one first transaction has been conducted, the or each first transaction generating data including first data comprising authentication data and second data identifying the or each first transaction, wherein a given first transaction is between a merchant and a card holder. A cryptographically signed and/or encrypted token corresponding to the given first transaction and comprising a characteristic of the first transaction has been generated using at least said second data. The cryptographically signed and/or encrypted token has been transmitted to the merchant. The method comprises receiving, from the merchant, data corresponding to a second transaction and in the event that the data corresponding to the second transaction includes the cryptographically signed and/or encrypted token, responsively authenticating the cryptographically signed and/or encrypted token, whereby to determine an authenticated association between the second transaction and a given first transaction.

19 Claims, 3 Drawing Sheets

(52) U.S. Cl.
CPC ........... *G06Q 20/389* (2013.01); *G06Q 20/40* (2013.01); *G06Q 20/4018* (2013.01); *G06Q 20/409* (2013.01)

(56) References Cited

U.S. PATENT DOCUMENTS

| | | | |
|---|---|---|---|
| 9,866,392 B1* | 1/2018 | Campagna | ................ H04L 9/14 |
| 10,242,368 B1* | 3/2019 | Poole | .................... G06Q 20/425 |
| 2002/0161721 A1* | 10/2002 | Yuan | .................... G06Q 20/047 |
| | | | 705/64 |
| 2003/0061171 A1* | 3/2003 | Gilbert | .................... G06Q 30/06 |
| | | | 705/65 |
| 2005/0119942 A1 | 6/2005 | Horrocks et al. | |
| 2005/0156026 A1* | 7/2005 | Ghosh | .................. G06Q 20/341 |
| | | | 235/380 |
| 2005/0240522 A1 | 10/2005 | Kranzley et al. | |
| 2005/0256806 A1* | 11/2005 | Tien | ........................ G06Q 20/04 |
| | | | 705/64 |
| 2009/0265262 A1* | 10/2009 | Chaudhari | ............. G06Q 20/10 |
| | | | 705/34 |
| 2010/0049619 A1* | 2/2010 | Beck | ..................... G06Q 20/381 |
| | | | 705/40 |
| 2011/0087537 A1* | 4/2011 | Hanafi | .................... G06Q 20/20 |
| | | | 705/14.34 |
| 2011/0161233 A1 | 6/2011 | Tieken | |
| 2011/0258123 A1 | 10/2011 | Dawkins et al. | |
| 2012/0259782 A1 | 10/2012 | Hammad | |
| 2013/0018793 A1* | 1/2013 | Wong | ................. G06Q 20/4097 |
| | | | 705/44 |
| 2013/0110722 A1* | 5/2013 | Boding | .............. G06Q 20/4016 |
| | | | 705/44 |
| 2013/0144792 A1* | 6/2013 | Nilsson | .............. G06Q 20/3829 |
| | | | 705/67 |
| 2013/0311313 A1* | 11/2013 | Laracey | ............. G06Q 20/3278 |
| | | | 705/16 |
| 2014/0006284 A1 | 1/2014 | Faith et al. | |
| 2014/0032409 A1* | 1/2014 | Rosano | ................. G06Q 20/401 |
| | | | 705/44 |
| 2014/0040144 A1* | 2/2014 | Plomske | .......... G06Q 20/38215 |
| | | | 705/64 |
| 2014/0040145 A1* | 2/2014 | Ozvat | ................... G06Q 20/027 |
| | | | 705/64 |
| 2014/0040148 A1 | 2/2014 | Ozvat | |
| 2014/0108641 A1* | 4/2014 | Cheung | .................. H04L 43/10 |
| | | | 709/224 |
| 2014/0143144 A1 | 5/2014 | Ducharme | |
| 2014/0143146 A1 | 5/2014 | Passanha et al. | |
| 2014/0351147 A1* | 11/2014 | Castrechini | ............ G06Q 20/20 |
| | | | 705/79 |
| 2015/0032626 A1 | 1/2015 | Dill et al. | |
| 2015/0254639 A1* | 9/2015 | Radu | ................. G06Q 20/3672 |
| | | | 705/41 |
| 2015/0324736 A1 | 11/2015 | Sheets et al. | |
| 2016/0125402 A1* | 5/2016 | Lee | .................... G06Q 20/3825 |
| | | | 705/67 |
| 2016/0267480 A1* | 9/2016 | Metral | ............... G06Q 20/3278 |

OTHER PUBLICATIONS

United Kingdom Search Report issued Oct. 16, 2015 on related British Application No. GB 1507047.7, filed Apr. 24, 2015.
International Search Report issued Jul. 26, 2016 on related PCT Application No. PCT/GB2016/051033, filed Apr. 13, 2016.
EESR, EP22152639, May 31, 2022, 8 pages.
KR Appln. No. 10-2017-7034122; Notice of Reasons for Rejection; Jan. 16, 2023; 13 pages.
Application No. 22152639.5 , European Examination Report, Mailed On Mar. 25, 2025, 9 pages.

* cited by examiner

METHOD OF RETAINING TRANSACTION CONTEXT

CROSS-REFERENCE TO RELATED APPLICATIONS

This application is a continuation of International Application No. PCT/GB2016/051033, filed Apr. 13, 2016, which claims priority to United Kingdom Application No. GB 1507047.7, filed Apr. 24, 2015. Each of the above-referenced patent applications is incorporated by reference in its entirety.

BACKGROUND OF THE INVENTION

Field of the Invention

The present disclosure relates to methods, systems and computer programs for retaining context across transactions that are conducted using a payment card.

Description of the Related Technology

A transaction between a cardholder and a merchant typically involves some level of authentication of the cardholder and/or of the card. For example, the EMV (Europay, MasterCard, Visa) standard provides for "chip and PIN" authentication, in which a POS (point of sale) card reader reads an integrated circuit (chip) on a payment card, such as a credit card or debit card, the cardholder enters a PIN, and the PIN entered by the cardholder is checked in relation to data stored for example on the chip. As another example, a transaction may be a card-not-present transaction, for example a mail order transaction, in which the payment card is not physically presented to the merchant. The cardholder may provide authentication data including a CSC (card security code). These authentication methods, and many others, are well known in the art. Typical authentication methods may include authentication of the card itself, for example by processing authentication data generated using secret data stored on the card, in addition to authentication of the cardholder. Typically the transaction data, including data indicative of the authentication, are transmitted to the issuing bank for authorization via a card scheme. For example, when a PIN entered by the cardholder is successfully checked against data stored on the card, the transaction data may include a flag indicating successful validation of the authentication data. In other systems, the PIN entered by the user may be transmitted for authentication by, for example, the card scheme or the issuing bank. The outcome of the authentication is taken into account by the issuing bank when deciding whether to reject or authorize a transaction. The authentication data may also be checked by the card scheme. For security reasons it is generally the case that a merchant is not permitted to store the authentication data.

A merchant may submit one or more or transactions associated with a prior transaction. For example, if a connection between the merchant and e.g. a card scheme or issuing bank is not possible at the time of the prior transaction, submission of this transaction may be delayed until after the cardholder has been provided with the goods and/or services to which the transaction relates. If the prior transaction is then rejected, for example due to lack of funds in the cardholder's account, the merchant may wish to later resubmit this transaction, in the hope that funds have since been replenished. In another example, the cardholder may wish to arrange a series of recurring transactions, for example as monthly payments. In both of these examples, at least one prior transaction has been authenticated but, as the merchant is not permitted to store transaction authentication data, the authentication data for the prior transaction is not available at the time of the later transaction or transactions.

Known systems which permit submission of later transactions associated with a prior transaction effectively allow transactions without full authentication data. This presents a security risk, as such transactions are more easily spoofed. Consequently, some card providers do not permit transaction resubmission or recurring transactions.

Consequently, there is a need for a secure method for authenticating a transaction associated with a prior transaction, without requiring the card provider to maintain a large transaction database.

SUMMARY

According to a first aspect of the present disclosure, there is provided a method of transaction authentication, in which: at least one first transaction has been conducted, the or each first transaction generating data including first data comprising authentication data and second data identifying the or each first transaction, wherein a given first transaction is between a merchant and a card holder; in which a cryptographically signed and/or encrypted token corresponding to the given first transaction and comprising a characteristic of the first transaction has been generated using at least said second data; and in which the cryptographically signed and/or encrypted token corresponding to the given first transaction has been transmitted to the merchant, the method comprising: receiving, from the merchant, data corresponding to a second transaction; and in the event that the data corresponding to the second transaction includes the cryptographically signed and/or encrypted token, responsively authenticating the cryptographically signed and/or encrypted token, whereby to determine an authenticated association between the second transaction and a given first transaction.

As a result, an efficient and secure method is provided for authentication of the second transaction based on the authenticated first transaction, without requiring independently generated authentication data. It is to be noted that the term "authentication data" as used herein encompasses a flag or flags indicating that authentication by e.g. a card reader was successful, a PIN entered by the user, a CSC card identifier and other suitable forms of authentication that will be readily understood by the skilled person. Examples of such other forms of authentication include biometric authentication, 3DSecure, and verification of cardholder login details. The authentication may be authentication of the identity of the cardholder, of the card, or both.

The method may further comprise transmitting data indicative of a result of said authentication of the cryptographically signed and/or encrypted token to a payment card issuer. In an embodiment, the method comprises transmitting data indicative of said determined authenticated association to a payment card issuer. As a result, the issuer may be confident that the second transaction is associated with the first transaction. The issuer may, for example, use this when deciding whether to accept or reject the second transaction.

In a further embodiment, the second transaction comprises a resubmission of the first transaction. A merchant may thus resubmit a failed transaction at a later date, for example in the hope that the card holder has added funds to their account, without needing to store any authentication data apart from the token and an identifier of the first transaction; the resubmission is thus securely identified with the first transaction.

According to some arrangements, the first transaction is an EMV transaction and the first data comprises EMV authentication data. Accordingly the first transaction, using the established and trusted EMV protocol (which requires the payment card to be present at the point of sale), may be trustworthily associated with the second transaction, for which no EMV authentication data is provided, without the merchant having to store authentication data other than the token.

In some other arrangements, the first transaction is a card-not-present transaction and in which the first data comprises card and/or cardholder authentication data. The card and/or cardholder authentication data may comprise card security code, CSC, authentication data. Accordingly the first transaction, using an established CSC protocol, may be trustworthily associated with the second transaction, for which no CSC authentication data is provided, without the merchant having to store authentication data other than the token.

According to some aspects of the present disclosure, at least the second transaction is one of a series of recurring transactions, and each of the series of recurring transactions occurs in accordance with a pre-determined schedule. As such a schedule of recurring transactions for which authentication data is not provided may be securely associated with the first transaction, for which authentication data was provided. In particular, it allows a merchant to submit recurring transactions without needing to store any authentication data apart from the token and an identifier of the first transaction; there is thus confidence that the resubmission is securely identified with the first transaction.

According to further aspects of the present disclosure, the first transaction comprises authorization for a subsequent transaction or transactions including at least the second transaction, and in which at least one of the number, timing, and monetary amount of said subsequent transaction or transactions was undecided when the first transaction was conducted. This allows such subsequent transactions for which authentication data is not provided to be associated with the first transaction, which authorizes the subsequent transactions and for which authentication data was provided.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
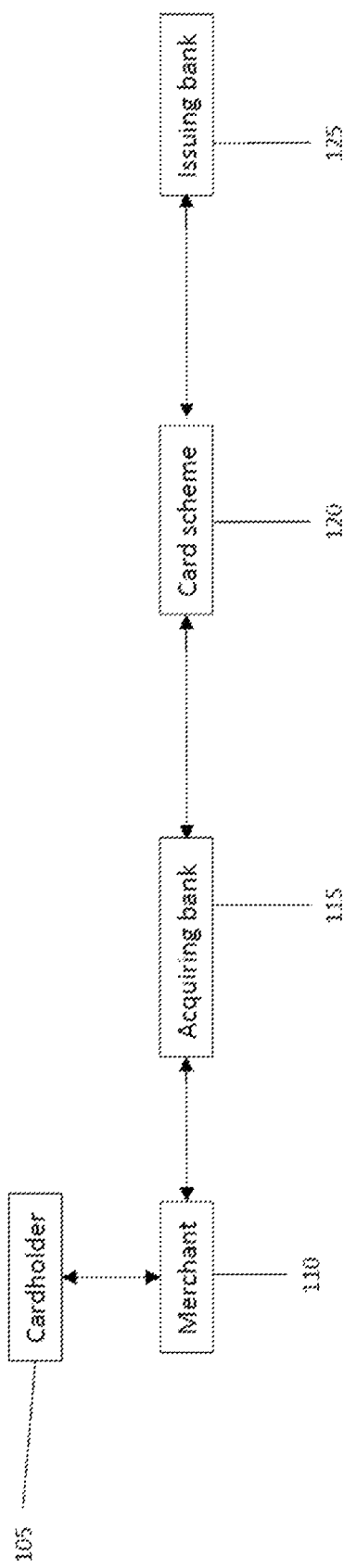
FIG. 1 shows a system architecture within which embodiments of the present disclosure may be practiced.

A system architecture according to embodiments of the present disclosure is shown in FIG. 1, which depicts a system configured according to the known four-party model for card payments. A cardholder 105 engages in a transaction with a merchant 110. The merchant may communicate with an acquiring bank 115. The acquiring bank may communicate with a card scheme 120, which in turn may communicate with an issuing bank 125.

Figure 2:
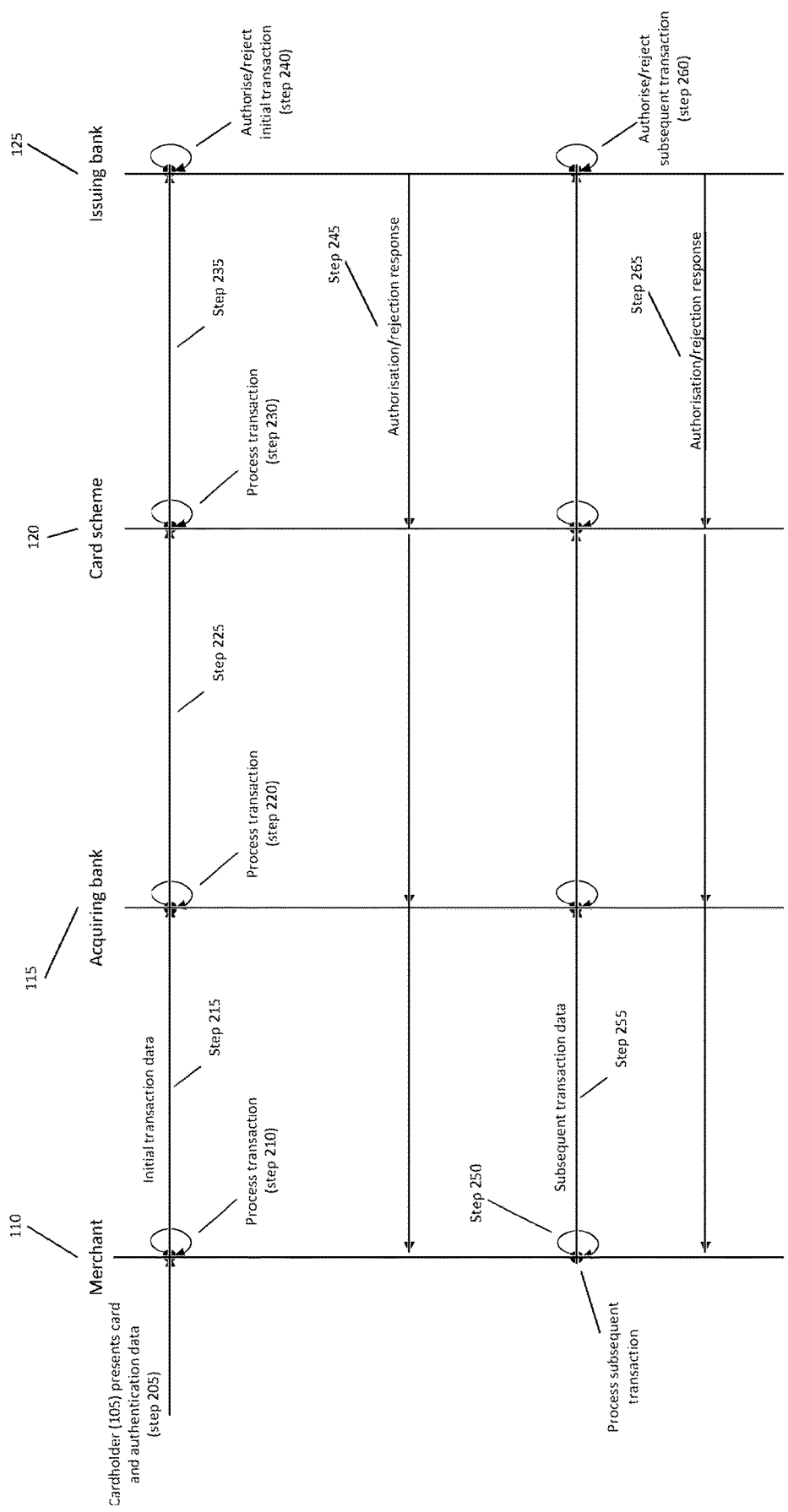
FIG. 2 shows a method for processing an initial transaction, for which authentication data is available, and a subsequent transaction, for which no authentication data is available.

FIG. 2 illustrates a conventional example transaction in such a system. A cardholder 105 presents a card and authentication data to a merchant 110 (step 205). The authentication data may for example be a PIN or signature provided by the cardholder. As another example, if the transaction is a card-not-present transaction, the authentication data may be a CSC. Other forms of authentication are known in the art.

The merchant processes the transaction (step 210), which may for example include capturing details relating to the transaction, and validating the authentication data provided by the cardholder. Such processing generates transaction data. If the transaction is validated at the point of sale, for example by validation of the authentication data by a processor on the card, the transaction data typically includes an indication of the outcome of this validation, for example a flag indicating that the cardholder entered a PIN correctly. Alternatively, if the authentication data is not validated at the point of sale, the authentication data may be included in the transaction data for later validation by for example the card scheme 120 or the issuer 125. In some embodiments in which the merchant validates the authentication data, the merchant simply does not transmit any transaction data if the validation is unsuccessful.

The merchant 110 transmits the transaction data to an acquiring bank 115 (step 215) which may perform additional processing, for example validating details of the transaction (step 220). The acquiring bank 115 transmits the transaction data to a card scheme 120 (step 225). The card scheme 120 may process the transaction data (step 230), for example to perform additional authentication. The card scheme 120 then transmits the transaction data to the issuing bank 125. The issuing bank 125 processes the transaction data, including deciding whether to authorize or reject the transaction (step 240). The result of this decision is based at least in part on the authentication data; for example the issuing bank 125 may be more likely to accept a transaction if the authentication method is relatively secure, such as an EMV "chip and PIN" authentication, and less likely to accept a transaction if the authentication method is less secure, such as CSC authentication in a card-not-present transaction. The issuing bank 125 transmits the result of this decision to the card scheme 120 (step 245), from which it is transmitted to the acquiring bank 115 and thence to the merchant 110.

As stated above, the merchant 110 may submit one or more subsequent transactions associated with the above-described initial transaction. The merchant 110 processes such a subsequent transaction (step 250), producing transaction data. As noted above, the merchant is not permitted to store the authentication data of the initial transaction. Further authentication data may not be available at the time of the subsequent transaction such as when the subsequent transaction is triggered without input from the cardholder. As such, authentication data is often not available for the second transaction. As with the initial transaction, the merchant 110 transmits the transaction data of the subsequent transaction to the acquiring bank 115, from which it is sent to the card scheme 120. The card scheme 120 transmits the transaction data to the issuing bank 125. The issuing bank 125 processes the transaction data which, as for the initial transaction, includes deciding whether to authorize or reject the subsequent transaction (step 260). As authentication data is not available for the subsequent transaction the issuing bank is typically less likely to authorize the transaction because it has less certainty that the transaction is legitimate. The result of this decision is then transmitted from the issuing bank 125 to the merchant 110 via the card scheme 120 and acquiring bank 115 (step 265).

Figure 3:
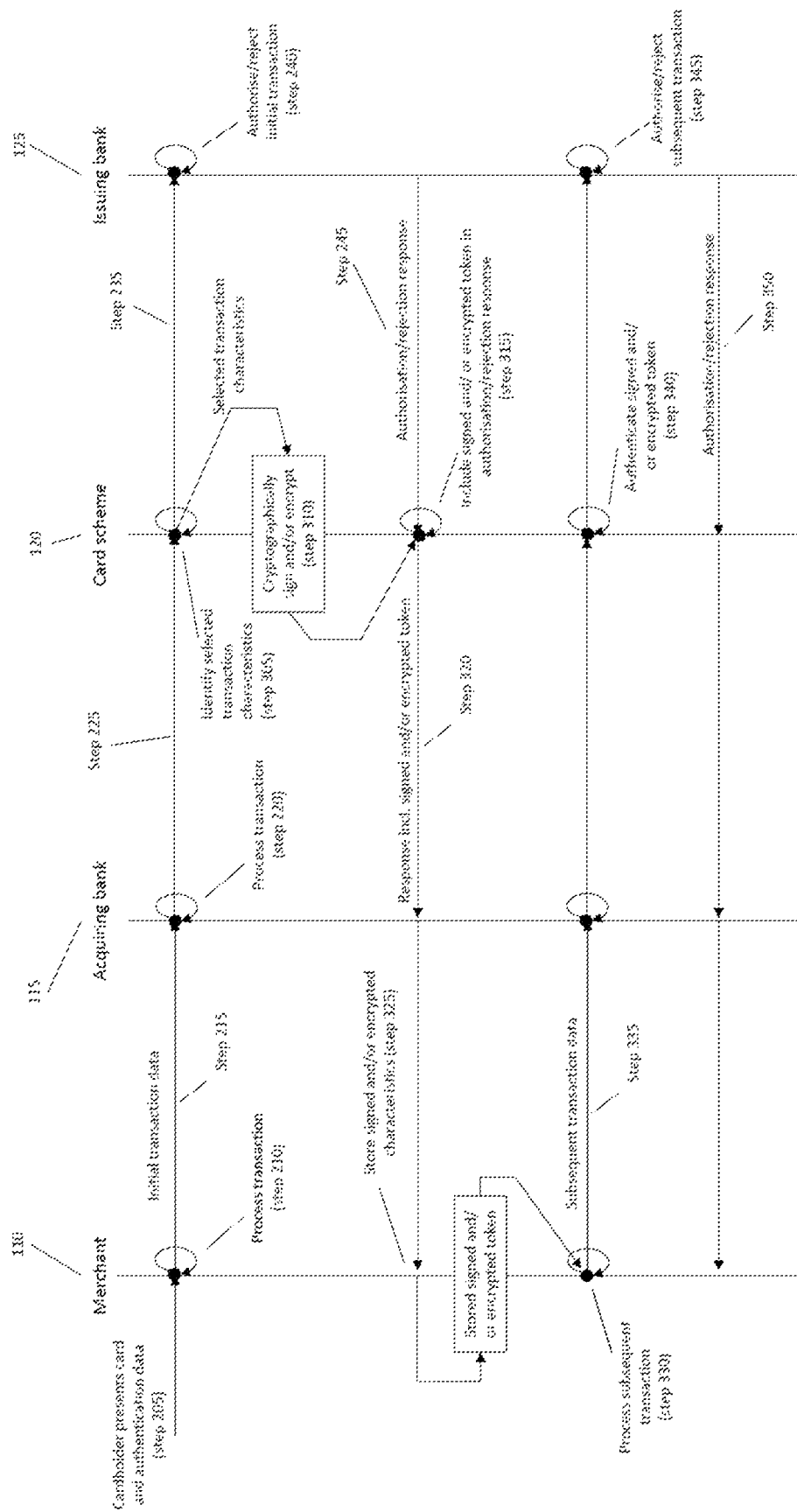
FIG. 3 shows a method for processing an initial transaction and a subsequent transaction. A cryptographically signed and/or encrypted token corresponding to the first transaction is used to determine an authenticated association between the two transactions.

A description of an improved method according to embodiments of the present disclosure will now be described with reference to FIG. 3. As described above, the cardholder 105 presents a card and authentication data to the merchant 110 (step 205), to perform an initial transaction.

The merchant processes the initial transaction (step 210), which may for example include capturing details relating to the transaction. Such processing produces transaction data, which includes either authentication data, for example provided by the cardholder, or data indicating the result of validation of authentication data at the point of sale.

The merchant 110 transmits the transaction data to the acquiring bank 115 (step 215) which may perform additional processing, for example validating details of the transaction (step 220). The acquiring bank 115 transmits the transaction data to a card scheme 120 (step 225). The card scheme 120 processes the transaction data and identifies selected characteristics of the transaction (step 305). The selected characteristics may include, for example, a unique transaction identifier, the date and/or time of the transaction, data identifying the merchant 110, data identifying the acquiring bank 115, data identifying the merchant 110, and data identifying the authentication context, for example identifying that EMV "chip and PIN" authentication was used. The card scheme 120 cryptographically signs and/or encrypts the selected transaction characteristic or characteristics (step 310), generating a cryptographically signed and/or encrypted token (hereafter referred to simply as a/the "token") corresponding to the initial transaction and comprising a characteristic of the first transaction. The token may also include other data. For example, such other data may describe constraints such as a limited validity period, or limitations on types of subsequent transactions that may be validly associated with the initial transaction, or the channels through which such subsequent transactions are permitted. As will be explained below, this token may later be validated by the card scheme 120 and as such private key cryptography techniques may be used. Examples of suitable private key cryptography processes are DES, Triple DES, AES, Twofish, Serpent, Blowfish, CASTS, RC4, Skipjack and IDEA. Alternatively, public key cryptography techniques may be used. Examples of such public key cryptography processes include RSA and elliptic curve cryptography. An advantage of using public key cryptography is that the token may be validated by any entity possessing the relevant public key certificate.

The card scheme 120 transmits the transaction data to the issuing bank 125 (step 235) which processes the transaction data, so as to, inter alia, decide whether to authorize or reject the transaction (step 240). The issuing bank 125 then transmits the result of this decision to the card scheme 120 (step 245).

In some aspects of the present disclosure, the card scheme 120 includes the token in a message indicating the result of the decision to authorize or reject the transaction (step 315). This combined message is then sent to the acquiring bank 115 (step 320), which forwards the message to the merchant 110. Alternatively, the card scheme 120 may transmit the token to the merchant 110 separately from the result of the decision to authorize or reject the transaction.

The merchant 110 then stores the token (step 325), meaning that in the event that the merchant 110 submits a subsequent transaction associated with the first transaction, the token can be sent along with other transaction details corresponding to the subsequent transaction, as indicated in steps 330 and 335. It should be noted that this is different to the situation in relation to authentication data of any particular transaction such as e.g. the initial transaction, which cannot be stored by the merchant, because the merchant may be permitted to store the token.

The card scheme 120 then attempts to authenticate the token (step 340), thereby determining an authenticated association between the initial transaction and the subsequent transaction. Since the token was generated using full authentication data from the initial transaction, successful authentication of the token confers confidence that the initial transaction both genuinely occurred and was successfully authenticated. As a result, authentication of the token provides confidence as to the legitimacy of the subsequent transaction, and as such the issuing bank may be more likely to approve the subsequent transaction. In alternative embodiments, the token may be authenticated by an entity other than the card scheme, for example the issuing bank.

The card scheme 120 may then transmit data indicative of the authentication of the token, or data indicative of a result of the authentication of the token, to the issuing bank 125. The issuing bank 125 may use this when deciding whether to authorize or reject the subsequent transaction (step 345). Successful authentication of the token provides an authenticated association between the first transaction and the subsequent transaction and as such the issuing bank may be more likely to authorize such a subsequent transaction compared to a subsequent transaction without full authentication data (such as that depicted in FIG. 2).

The issuing bank 125 transmits the result of the decision to authorize or reject the subsequent transaction to the card scheme 120 (step 350). The result is then forwarded from the card scheme 120 to the acquiring bank 115, and from the acquiring bank 115 to the merchant 110.

The above described method provides an efficient and secure method for authentication of the subsequent transaction based on the authenticated initial transaction, without requiring independent authentication data.

The subsequent transaction may for example be a resubmission of the initial transaction following a rejection of the initial transaction. Alternatively, it may be one of a series of recurring transactions, each of the recurring transactions occurring in accordance with a pre-determined schedule. Information describing this schedule may be included in the token. As another example, the initial and subsequent transactions may comprise split-shipment transactions, in which a large transaction is divided into smaller transactions and billed separately.

It should be noted that the use of the word "steps" in this disclosure does not imply that the steps are performed in any given order. As an illustrative example, with reference to FIG. 3, step 235 may be performed before, after or in parallel with step 310.

It should also be noted that the terms "merchant", "acquiring bank", "card scheme" and "issuing bank" are to be understood as referring to computerized systems that are configured to perform the functions described above.

The example embodiments described above can be implemented in many ways, such as program instructions for execution by a processor, as logic circuits, as an application specific integrated circuit, as firmware, etc. For example, the embodiments can be implemented as one or more software or firmware applications, computer-implemented methods, program products stored on a computer useable medium, for execution on one or more processors (e.g., CPU, microcontroller) or other computing devices in a wireless station.

The above embodiments are to be understood as illustrative examples of the invention. Further embodiments are envisaged. For example, multiple irregularly spaced subsequent transactions may be made based on a single initial transaction as and when the cardholder uses a service or purchases a product, for example a taxi service or an open tab at a bar. The initial transaction may thus comprise pre-authorization for the subsequent transactions. In further embodiments, the present disclosure allows for incremental authorization, for example if a cardholder decides to extend their stay at a hotel. As another example, an initial transaction may comprise a booking, for example with a hotel or travel agent, and subsequent transactions may relate to subsequent upgrades or add-ons, or a no-show fee, or ancillary charges such as for usage of a mini-bar. This would, for example, allow a cardholder to be charged appropriately after a hotel stay without being physically present at the check-out. A further embodiment of the present disclosure would allow for a payment in installments. As another example, the present disclosure allows for a debt recovery transaction, for example for variable fare public transit. In such embodiments, a transaction may be attempted after the cardholder has used the transit service, for example at the end of the day. This may for example allow for a reduced fare if multiple journeys are undertaken in one day. If this transaction is rejected, for example due to lack of funds in the cardholder's account, subsequent transactions according to the present disclosure may be attempted in order to recover the debt.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of transaction authentication, the method comprising:
   receiving, from a merchant in a first transaction, first data comprising authentication data and second data identifying the first transaction and including a characteristic of the first transaction, the characteristic of the first transaction comprising a transaction identifier or a time and date of the first transaction, and data identifying a specific authentication process in which the merchant authenticates a card holder, wherein the first transaction is between the merchant and the card holder, wherein the merchant is unauthorized to store the first data;
   responsive to receiving the first data and the second data, generating a cryptographically signed token corresponding to the first transaction by cryptographically signing the second data such that the cryptographically signed token comprises cryptographically signed (1) the characteristic of the first transaction comprising the transaction identifier or the time and date of the first transaction, and (2) data identifying the specific authentication process;
   transmitting the cryptographically signed token to the merchant, the merchant thereafter storing the cryptographically signed token;
   receiving, from the merchant, data corresponding to a second transaction and the cryptographically signed token, wherein the data corresponding to the second transaction is devoid of the first data and any additional authentication data;
   authenticating the cryptographically signed token by cryptographically validating the cryptographically signed token using a public key of a public key certificate, wherein a successful authentication of the cryptographically signed token confers confidence that the first transaction has genuinely occurred and was successfully authenticated since the cryptographically signed token was generated using data identifying the specific authentication process associated with the first transaction, thereby
   determining that an authenticated association exists between the second transaction and the first transaction based on the successful authentication of the cryptographically signed token using the public key; and
   authorizing the second transaction when the authenticated association exists between the second transaction and the first transaction.

2. The method of claim 1, further comprising:
   transmitting data indicative of a result of the authentication of the cryptographically signed token to a payment card issuer.

3. The method of claim 2, wherein the second transaction comprises a resubmission of the first transaction.

4. The method of claim 1, further comprising:
   transmitting data indicative of said determined authenticated association to a payment card issuer.

5. The method of claim 1, wherein the first transaction is an EMV transaction and the authentication data is EMV authentication data.

6. The method of claim 1, wherein the first transaction is a card-not-present transaction.

7. The method of claim 6, wherein the authentication data comprises a card security code.

8. The method of claim 1 wherein at least the second transaction is one of a series of recurring transactions, each of the series of recurring transactions occurring in accordance with a pre-determined schedule.

9. The method of claim 1, wherein the first transaction comprises authorization for a subsequent transaction or transactions including at least the second transaction, and in which at least one of a number, timing, and monetary amount of said subsequent transaction or transactions was unknown when the first transaction was conducted.

10. The method of claim 1, wherein the characteristic of the first transaction is the transaction identifier.

11. The method of claim 1, wherein the characteristic of the first transaction is the time and date of the first transaction.

12. The method of claim 1, wherein the characteristic of the first transaction further includes data regarding channels in which subsequent transactions can occur without further authentication.

13. The method of claim 1, wherein the first data is received from the merchant via an acquirer bank.

14. The method of claim 13, wherein the acquirer bank validates details of the first transaction.

15. The method of claim 1, wherein the characteristic of the first transaction further comprises data identifying the merchant.

16. The method of claim 1, wherein the authentication process comprises a chip and PIN authentication process.

17. The method of claim 1, wherein the authentication data comprises a card security code.

18. A non-transitory computer-readable storage medium comprising a set of computer-readable instructions stored thereon, which, when executed by at least one processor cause the at least one processor to perform a method comprising:
   receiving, from a merchant in a first transaction, first data comprising authentication data and second data identifying the first transaction and including a characteristic of the first transaction, the characteristic of the first transaction comprising a transaction identifier or a time and date of the first transaction, and data identifying a specific authentication process in which the merchant authenticates a card holder, wherein the first transaction is between the merchant and the card holder, wherein the merchant is unauthorized to store the first data;
   responsive to receiving the first data and the second data, generating a cryptographically signed token corresponding to the first transaction by cryptographically signing the second data such that the cryptographically signed token comprises cryptographically signed (1) the characteristic of the first transaction comprising the transaction identifier or the time and date of the first transaction, and (2) data identifying the specific authentication process;
   transmitting the cryptographically signed token to the merchant, the merchant thereafter storing the cryptographically signed token;
   receiving, from the merchant, data corresponding to a second transaction and the cryptographically signed token, wherein the data corresponding to the second transaction is devoid of the first data and any additional authentication data;
   authenticating the cryptographically signed token by cryptographically validating the cryptographically signed token using a public key of a public key certificate, wherein a successful authentication of the cryptographically signed token confers confidence that the first transaction has genuinely occurred and was successfully authenticated since the cryptographically signed token was generated using data identifying the specific authentication process associated with the first transaction, thereby
   determining that an authenticated association exists between the second transaction and the first transaction based on a successful authentication of the cryptographically signed token using the public key; and
   authorizing the second transaction when the authenticated association exists between the second transaction and the first transaction.

19. Apparatus comprising:
   at least one processor; and
   at least one memory including computer program instructions executable by the at least one processor, to perform a method comprising:
   receiving, from a merchant in a first transaction, first data comprising authentication data and second data identifying the first transaction and including a characteristic of the first transaction, the characteristic of the first transaction comprising a transaction identifier or a time and date of the first transaction, and data identifying a specific authentication process in which the merchant authenticates a card holder, wherein the first transaction is between the merchant and the card holder, wherein the merchant is unauthorized to store the first data;
   responsive to receiving the first data and the second data, generating a cryptographically signed token corresponding to the first transaction by cryptographically signing the second data such that the cryptographically signed token comprises cryptographically signed (1) the first characteristic of the first transaction comprising the transaction identifier or the time and date of the first transaction, and (2) data identifying the specific authentication process;
   transmitting the cryptographically signed token to the merchant, the merchant thereafter storing the cryptographically signed token;
   receiving, from the merchant, data corresponding to a second transaction and the cryptographically signed token, wherein the data corresponding to the second transaction is devoid of the first data and any additional authentication data;
   authenticating the cryptographically signed token by cryptographically validating the cryptographically signed token using a public key of a public key certificate, wherein a successful authentication of the cryptographically signed token confers confidence that the first transaction has genuinely occurred and was successfully authenticated since the cryptographically signed token was generated using data identifying the specific authentication process associated with the first transaction, thereby
   determining that an authenticated association exists between the second transaction and the first transaction based on a successful authentication of the cryptographically signed token using the public key; and
   authorizing the second transaction based upon the authenticated association exists between the second transaction and the first transaction.

* * * * *